United States Patent
Tuma

(10) Patent No.: US 7,771,634 B2
(45) Date of Patent: Aug. 10, 2010

(54) METHOD FOR THE PRODUCTION OF A SUPPORT WEB THAT IS MADE OF PLASTIC WITH A MODIFIED MFI

(75) Inventor: Jan Tuma, Herrenberg (DE)

(73) Assignee: Gottlieb Binder GmbH & Co., KG, Holzgerlingen (DE)

(*) Notice: Subject to any disclaimer, the term of this patent is extended or adjusted under 35 U.S.C. 154(b) by 182 days.

(21) Appl. No.: 11/792,917

(22) PCT Filed: Apr. 11, 2005

(86) PCT No.: PCT/EP2005/003778
§ 371 (c)(1), (2), (4) Date: Jun. 13, 2007

(87) PCT Pub. No.: WO2006/074705
PCT Pub. Date: Jul. 20, 2006

(65) Prior Publication Data
US 2008/0143007 A1  Jun. 19, 2008

(30) Foreign Application Priority Data
Dec. 23, 2004 (DE) .................. 10 2004 062 042

(51) Int. Cl.
*B29C 47/04* (2006.01)
(52) U.S. Cl. .................. 264/167; 264/173.18
(58) Field of Classification Search .......... None
See application file for complete search history.

(56) References Cited
U.S. PATENT DOCUMENTS

| | | |
|---|---|---|
| 3,051,995 A | 9/1962 | Ferrell et al. |
| 4,978,486 A | 12/1990 | Ito et al. |
| 5,077,870 A | 1/1992 | Melbye et al. |
| 5,554,250 A * | 9/1996 | Dais et al. .................. 156/353 |
| 6,136,046 A | 10/2000 | Fukunishi et al. |
| 6,179,887 B1 * | 1/2001 | Barber, Jr. .................. 51/298 |
| 6,592,800 B1 | 7/2003 | Levitt et al. |
| 2003/0135964 A1 | 7/2003 | Provost et al. |
| 2004/0229739 A1 | 11/2004 | Gorman et al. |

FOREIGN PATENT DOCUMENTS

| | | |
|---|---|---|
| AT | 400 316 | 12/1995 |
| DE | 102 23 374 | 12/2003 |
| DE | 102 33 468 | 2/2004 |
| EP | 0 348 907 | 1/1990 |
| JP | 02-283305 | 6/1992 |
| JP | 07-213310 | 3/1997 |
| WO | WO 00/73063 | 12/2000 |
| WO | WO 02/13647 | 2/2002 |

* cited by examiner

*Primary Examiner*—Monica A Huson
(74) *Attorney, Agent, or Firm*—Roylance, Abrams, Berdo & Goodman, L.L.P.

(57) ABSTRACT

A method produces a support web (10) made of a predefined amount of plastic material by a plurality of molding elements (16, 17) formed in hollow spaces (12) of a mold (5). The plastic material is fed to the mold (5) via at least one extruder nozzle (1) of an extruder apparatus (18). To be able to lower the processing temperature while the plastic material obtains a very good molding behavior into the hollow spaces of a mold, the plastic material is intrinsically provided with at least one additive such that the melt flow index (MFI) of the plastic material remains constant or preferably increases.

14 Claims, 1 Drawing Sheet

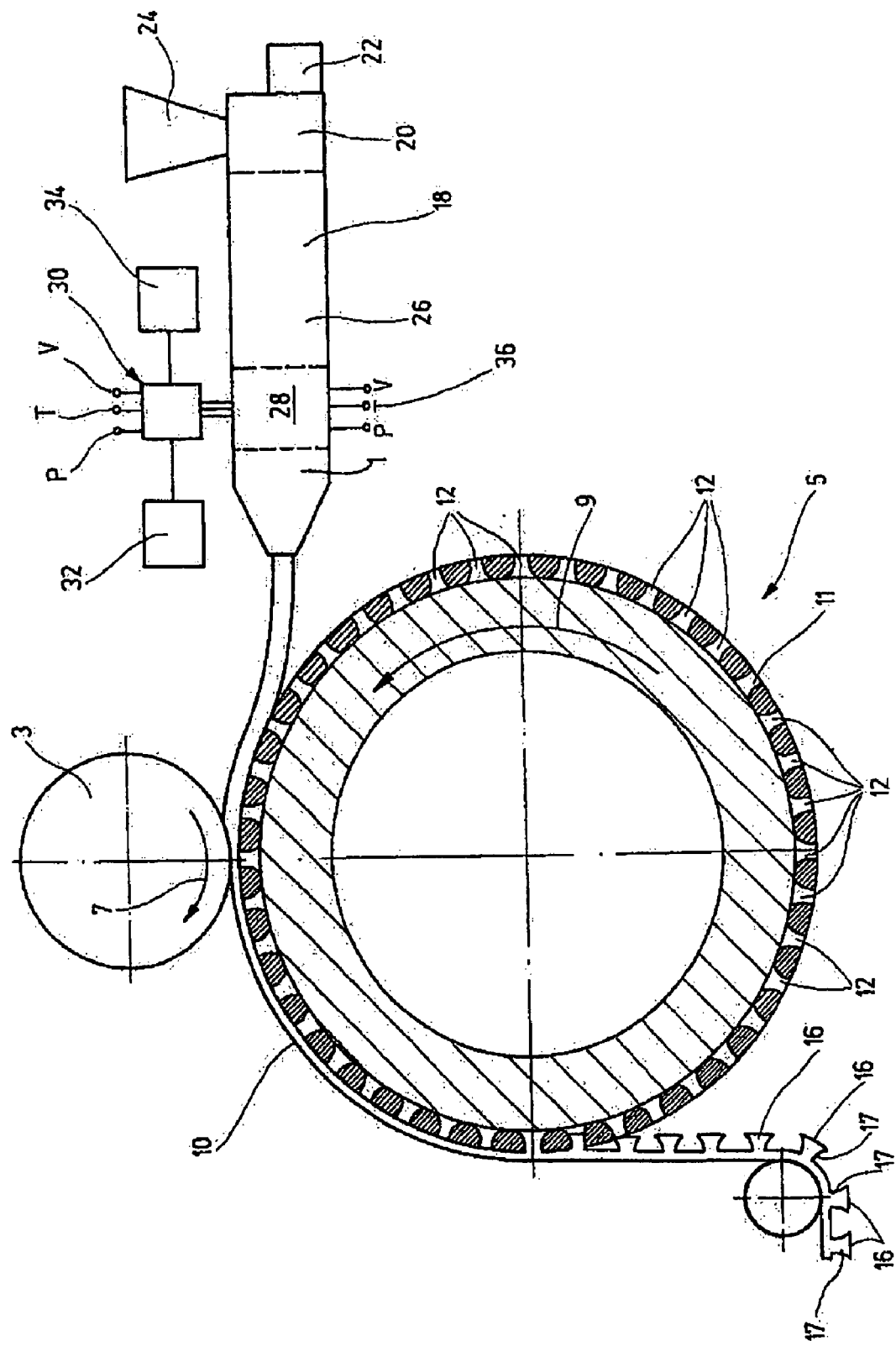

METHOD FOR THE PRODUCTION OF A SUPPORT WEB THAT IS MADE OF PLASTIC WITH A MODIFIED MFI

FIELD OF THE INVENTION

The present invention relates to a method for the production of a support web made of a definable amount of plastic material with a plurality of molded elements shaped in the mold cavities of a molding tool. The plastic material is supplied to the molding tool via at least one extruder nozzle of an extruder.

BACKGROUND OF THE INVENTION

WO 02/13647 A2 discloses a process for producing a hook and loop fastener part, with a plurality of molded elements made symmetrically and connected integrally to a support web. Each molded element is in the form of interlocking means having a stalk with a head part. A moldable material is supplied to the shaping zone between a pressure tool and a molding tool. In the known process, viewed at least in a longitudinal section of a mold cavity, the opposing boundary walls extend continuously convexly. A continuously extending transition between the cross sectional shapes of the stalk and head part for an interlocking means of the support is achieved, so that an unimpeded mold removal process results.

In this process, a suitable plastic granulate is plasticized via an extruder, and is supplied to the extruder nozzle of the extruder for delivery to the molding tool. The plastic material used for this purpose generally leads to colorless hook and loop fastener parts of limited transparency. If the finished hook and loop fastener product is to be colored, the plastic granulate used can be already colored and supplied it to the product process (master batch), or color pigments, for example, in the form of titanium oxide, can be added to the plastic granulate, for coloring white and then supplied to the production process. Since the dyes used for this purpose, in addition to dye pigments, have chemical and mechanical behavior not exactly known to the custom molder and are dictated by the manufacturer, in the actual course of the production process problems may arise, especially with respect to removing the individual finished molded elements from the mold cavities of the molding tool.

When white dyes in the form of titanium dioxide color pigments are added, the melt flow index (MFI) measured in grams per 10 minutes for the plastic material has been found clearly to deteriorate. This coloring process cannot be used at all in master batch operation for micro-hook and loop fasteners. Because of the very poor flow behavior of the plastic, it can no longer be delivered into the exceptionally geometrically small cavities (mold cavities) of the molding tool. Attempts undertaken in practice to improve the molding behavior such that the molding temperature for the plasticized plastic material is increased, however generally lead to temperature ranges being reached which damage the plastic material and make production of hook and loop fastener products in that range of sizes impossible. It is also difficult, without major cleaning effort on the extruder, to switch from one color to the next for the finished hook and loop fastener product during the production process which proceeds more or less continuously.

To remedy this problem, the prior art (JP 07213310 A, JP 02283305 A and WO 00/73063 A1) has already suggested coloring or/or printing of male and/or female engagement parts of pressure sensitive adhesive fasteners by inkjet or electrostatic application processes. On the one hand, extensive freedom of shaping in color application in these processes is not possible. On the other hand, these processes can only be economically carried out when large amounts of fastener material to be produced are colored with a dye. These processes are in turn limited in their application, if micro-hook and loop fasteners are to be tinted in this way.

U.S. Pat. No. 6,136,046 discloses inkjet dye application processes, in addition to electrostatically acting systems and ultrasonic systems, also using piezoresistive element systems for dye application. These processes also have application limits if hook and loop fasteners are to be tinted with them, since the projecting head parts on the ends of the fastener stalks form undercuts with them. The undercuts can only be covered with difficulty by dye application from the outside. If, as is recognized, the color is also applied only to the top of the hook and loop fastener material, it fundamentally wears leading to decoloration of the fastener product over the long term. Conditions are comparable when the fastener material is printed with dye or the dye is doctored onto the fastener material. Stria formation often occurs unintentionally, as do problems in drying of the dye leading to loss of quality. To be able to ensure reliable adhesion of the dye at all, "priming" and/or additional surface treatment processes are necessary.

SUMMARY OF THE INVENTION

An object of the present invention is to provide a process for producing a hook and loop fastener product allowing improved molding behavior of the plastic material into the cavities of a molding tool, with preferably simultaneous reduction of the processing temperature.

Another object of the present invention is to provide a process for producing a hook and loop fastener product enabling coloring for the hook and loop fastener product.

These objects are basically achieved in principle by a process where the plastic material is intrinsically provided with at least one additive such that the melt flow index (MFI) of the plastic remains constant, and preferably rises. On the one hand, the processing temperature can be reduced, and still very good molding behavior of the plastic material into the respective cavities of a molding tool is achieved. In particular, a processing temperature can be stipulated which does not damage the plastic material. By increasing the melt flow index by the additive, improved molding behavior of the molded element of the hook and loop fastener product is achieved, so that micro- or nano-hook and loop fasteners with the size of mold elements in the micro or nano range can be produced, especially with complicated mold geometries (pronounced undercuts), as cannot be easily produced to date with conventional processes.

Depending on the selected additive and as the melt flow index increases, other possibilities for influencing the hook and loop fastener product can arise. For example, mechanical characteristics of flexibility and toughness can be adjusted by the additive causing an analogous change of the crystallite formation in the plastic material during the shaping process.

Preferably, a type of lubricant phase as the additive is supplied to the plastic material as another phase. The lubricant phase improves the molding behavior of the plastic material into the cavities of the molding tool with simultaneously reduced molding temperature. The lubricant phase can be additives such as fatty acid esters, fatty acid ester ethoxylates, paraffin oils and vegetable oils, such as biodegradable rapeseed oil, or combinations thereof. This lubricant phase also ensures that even at elevated processing temperatures, a reliable process sequence is ensured. This processing would not be guaranteed, for example, when using solvent-containing additives with respect to their combustibility (low ignition points).

It has been found to be especially advantageous to supply as another additive a dye phase forming a coloring liquid with the lubricant phase. Processing conditions are especially good when relative to the added plastic material the proportion of the total additive is approximately 0.05 to 5% by weight, preferably 0.2 to 0.6% by weight, especially preferably 0.5% by weight. It has also been found to be especially favorable to use pigments with a particle size <10 μm to keep constant or raise the melt flow index value as a dye for the dye phase in that framework of percentages by weight. In this structure, a fine dispersion of the pigment material is then present in the plastic matrix, especially in the form of a polymer matrix, with the result that migration processes for the colored particle portions of the suspension composite built up in this way are for the most part precluded. It has also proven especially advantageous to use ultramarine blue as the dye for the dye phase in that range of percentages by weight to increase the melt flow index value.

If to increase the melt flow index the plastic material is intrinsically provided with a coloring liquid by the coloring liquid being supplied preferably by a metering means from the outside to the extruder at a location at which the plastic material is present at least partially plasticized, the initial material for the extruder can be conventional plastic granulate known pertinently in terms of its production behavior and can be managed in this way. If coloring liquid is supplied to the plasticized plastic material, it is thoroughly mixed with the coloring liquid from the inside (intrinsically) so that the degree of penetration for the entire plastic material is uniform. The coloring liquid can also be supplied on the input side to the extruder without the plastic material having to be plasticized until then.

Since the plastic material is tinted continuously and uniformly by the coloring liquid supplied by the metering means, wear phenomena on the fastener material can be managed without this leading to decoloration. Since the coloring liquid is supplied to the extruder by the metering means, a color change proceeds promptly and especially without major cleaning efforts, so that a color change in a continuing production process leads only to extremely low scrap rates. Since a host of colors can be added as a coloring liquid, hardly any limits exist on the configuration possibility, and mixed colors for a hook and loop fastener part can be obtained in this way. Since color addition is very uniform, the requirements for increased product quality are likewise met.

Preferably, the coloring liquids are those color systems as dye phases which, in addition to the actual dye and lubricant phase, have binders and optionally softeners, multivalent alcohols or amines as well as alcohol ethoxylates. Since the lubricant phase of the coloring liquid is free of solvent, at elevated processing temperatures within the extruder, safe dyeing operation can be achieved.

In one especially preferred embodiment of the process according to the present invention, depending on the plasticization state of the plastic material and its temperature, a variable amount of the coloring liquid is supplied by the metering means such that a degree of tinting for the support web with the molded elements is made uniform. By the corresponding sensors (temperature and pressure), the processing situation of the plasticized plastic material within the extruder can be reconstructed. By a suitable control, the metering means is triggered such that for a compacted plastic material less color is added, and at reduced coherence a smaller amount of coloring liquid is added. In this way uniform color addition to the plastic material is possible, and the finished product (hook and loop fastener product) produced later can be regarded as having been continuously uniformly colored.

In another especially preferred embodiment of the process according to the present invention, the support web and/or the molded elements are coextruded or produced from extrudable individual layers. In this multilayer structure, if necessary each layer can be assigned its own color so that there is a host of shaping possibilities for coextruded fasteners. Preferably, coextrusion for each individual layer uses its own extruder in addition to the extruder nozzle and dye metering means. In this way, in the corresponding replacement processes of the colors among the individual layers, the continuing production rates can be increased since within production operation it is easily possible to change the color for each pertinent individual layer.

Furthermore, it has been found to be especially favorable to supply the coloring liquid within the extruder by the metering means at the point at which the plastic material is supplied to the extruder nozzle. In this zone of the extruder, preferably a diamond-shaped mixer or the like again homogenizes the compacted plastic material. When the color is added at the homogenization site there, this addition leads to homogenization of the color addition on the finished product (hook and loop fastener part). In addition or alternatively, it is also possible to supply the additive, especially in the form of a coloring liquid, at the start of the processing segment of the extruder, for example, by a metering hose pump.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawing which forms a part of this disclosure:

FIG. 1 is a schematic, not to scale, side elevational view in partial section of a device for carrying out the process according to an exemplary embodiment of the present invention.

DETAILED DESCRIPTION OF THE INVENTION

FIG. 1 schematically shows parts of a device for executing the process according to the present invention with an extruder head 1 as a supply means or supplier for especially thermoplastic material in the plastic or liquid state. This plastic material is supplied as a strip, with a width corresponding to that of the hook and loop fastener part to be produced, to a gap between a pressure tool 3 and a molding tool 5. The pressure tool 3 is a compression roll. The molding tool 5 is a molding roll. Both rolls are driven in the directions of rotation indicated with curved arrows 7 and 9 so that a conveyor gap is formed between them through which the plastic strip is conveyed in the transport direction. At the same time, the material is molded into the support strip 10 of the hook and loop fastener part, and the support strip 10 on the side adjoining the molding roll acquires the shape necessary to form the interlocking means (molded elements) by the shaping elements of the molding roll.

For this purpose, the molding roll 5 on the periphery has a screen 11 with individual mold cavities 12. The mold cavities 12, which are not detailed, are regularly distributed over the molding roll with its screen 11 on the outer peripheral side, the distribution and number being freely selectable. In particular, the mold cavities 12 are provided with boundary walls which run or extend convexly so that a type of hyperboloid structure is formed corresponding to the molded element to be produced. It is therefore possible with the mold cavities 12 to produce interlocking means or molded elements in the form of one stalk part 17 provided with a head part 16. This production structure for interlocking means or other molded elements is conventional and is detailed, for example, in WO 02/13647 A2 so that it will no longer be detailed here.

The plastic materials to be processed and used can be varied, for example, in the form of polyamides or polyolefins, such as polypropylene or polyethylene (HDPE, LDPE and LLDPE). Other thermoplastics can be used, such as polyamides, polyesters (polyethylene terephthalate), polystyrenes, polycarbonates, polymethyl-methacrylates, ethylene, vinyl acetate copolymers including acrylate modified ethylenes, vinyl acetate polymers and ethylene acrylic acid copolymers and polyethylene styrenes. Thermoplastic elastomers such as naturally or synthetically producible rubber including styrene block copolymers with proportions of isoprene, butadiene or ethylene (butylene) blocks can be used. Furthermore, there is use for metallocene-catalyzed polyolefin, polyurethane or polydiorganosiloxanes. To stiffen the support web 10 and for strengthening, ductile thermoplastics can be used, such as nylon or polyvinyl chloride. The molded element articles produced in each case, especially in the form of a hook and loop fastener part, can also be provided with coverings and coatings which can be vapor deposited or doctored on. To produce structuring in the sense of self-cleaning surfaces, post-treatments are possible, whether with a laser, ultrasound, or the like. In particular, production materials can be used which are biodegradable, as can those which can be especially easily tinted.

For the purposes of the present invention, the plastic material is provided intrinsically with at least one additive such that the melt flow index (MFI value) of the plastic material rises. This melt flow index value is generally measured in grams per 10 minutes. In normal processing of thermoplastic material, for example, in the form of polypropylene, with a sample density of 0.905 g/cm$^3$, the average MFI values are approximately 61 g per 10 minutes. When an additive which increases the melt flow index value is introduced into the plastic material, MFI values of an average of 71 are formed. This increase is equivalent to an increase of approximately 15%. To achieve this increase of the MFI value which can also be much higher, the additive is a type of lubricant phase supplied to the plasticized base material as another phase to improve the molding behavior of the plastic material with simultaneously reduced molding temperature. In this way, micro- or nano-hook and loop fasteners with molded or interlocking elements on the order of magnitude of micrometers or nanometers can be easily produced.

Preferably, the additive is a coloring liquid which preferably forms an apolar system, and as the lubricant phase, has liquid binders and the actual dye. Furthermore, there can be anticaking agents in the coloring liquid as the system, and optionally other loading materials, for example, in the form of processing aids, stabilizers, antistatic agents, nucleation agents, etc. Binders or lubricants can be, for example, fatty acid esters and/or fatty acid ester ethoxylates, paraffin oils, including biodegradable oils, such as rapeseed oil. Use of biodegradable oils as the lubricant phase has the advantage that hook and loop fastener parts produced in this way can also be used in critical fields, such as in the diaper or food sectors. The coloring liquid can have softeners, multivalent alcohols, and/or amines and alcohol ethoxylates including other, system-specific components. They can be used either alone or in mixture. The choice of the lubricant phase depends preferably on the thermoplastic material to be tinted, or for elastomers, on the chemistry of the overall system. Very good values for increased MFI in any case have been achieved when ultramarine blue is used as the dye for the dye phase.

In the thermoplastic materials preferably being used here, mainly fatty acid esters, fatty acid ethoxylates, paraffin oils and vegetable oils, and in the case of PVC, softeners have proven effective. To produce a coloring liquid, the formulation components which have been weighed in are added to or dispersed into the pertinent agents and then ground. This grinding is not actual primary grain crushing, but simple breaking up the agglomerates as completely as possible to achieve optimum dispersion of the dyes in the binder system.

The extruder head 1 with the extruder nozzle is a part of an extruder 18. This extruder 18 has an extruder worm (not shown) extending from an entry zone 20 to the extruder head 1 with the extruder nozzle. This extruder worm is continuously driven via a drive, for example, in the form of an electric motor 22. An entry point 24 for supply of the plastic granulate (not detailed), for example, in the form of a thermoplastic material, is connected to the entry zone 20. Within the extruder 18, a heating and compaction zone 26 is connected to the entry zone 20. The heating and compaction zone on its side facing away from the entry zone 20 discharges into a homogenization zone 28 to which in turn the extruder head 1 with the extruder nozzle is connected. The homogenization zone 28 is preferably formed by a diamond-shaped mixer (not shown) integrated into the extruder worm. The homogenization zone 28 is designed especially to re-homogenize possibly compacted plastic material before that material is discharged.

A metering means or device 30 is connected to the homogenization zone 28. This means is shown simplified in the FIGURE in the form of a blank box. In addition to the control or control means 32, the metering means 30 has at least one dye storage tank 34 for the coloring liquid. Sensors for pressure P, temperature T and possibly the velocity V of the plastic material also discharge or extend into the homogenization zone. The outputs of the sensors 36 are analogously connected to the inputs of the metering means 30. In addition to the described sensors, other sensors (not shown) can be used, for example, for viscosity, etc. Preferably, pressure sensors are located at various sites to be able to determine the pressure differences for the analogous triggering of the metering means 30 to obtain uniform color delivery into the plastic material.

The respective operating state of the plastic material in the homogenization zone 28 is detected by the sensors 36. Depending on the sensor readings, the control means 32 feeds the liquid dye stored in the tank 34 into the homogenization zone 28 of the extruder 18. If changes on the plastic material occur due to the properties, for example, it is compacted, less coloring liquid is supplied via the metering means 30 than if the plastic material is not too tightly packed.

By metering means 30, dye always travels uniformly into the plastic material. For the finished product, this arrangement leads to the dye being homogeneously added continuously. The metering means 30 also makes it possible to remove coloring liquid if necessary from several color storage tanks (not shown) to mix them and then to deliver them in mixed form at the same time or in alternation into the plastic material. If the support web 10 is to be built up into several layers in a coextrusion process, each layer can be assigned its own extruder with its own metering means for the coloring liquid so that each layer fundamentally could be assigned it own color. Since the path between the homogenization zone 28 and the extruder head 1 is very short, for a possible color change an immediate changeover to the next color would be directly possible. In this way, the scrap rate for unwanted coloring or discolored material can be largely reduced. Another possibility for adding color involves supplying the coloring liquid at the input of the extruder 18 by a hose metering pump (not shown), for example, at the entry site 24, in the region of the entry zone 20 or directly behind the entry zone 20.

If, as is shown in the prior art, in a master batch operation, titanium oxide as the coloring pigment is supplied to the plastic material, for example, in the form of a polypropylene material, the melt flow index MFI decreases in a duplicated comparison measurement to 46 g per 10 minutes. This decrease results, for the pertinent coloring process, in a much higher shaping temperature being selected to be able to ensure the molten molding behavior of the plastic material required for the cavities in a comparable production situation. The higher temperature required leads to high thermal loading of the plastic material. This thermal loading ultimately indicates the limits for free shaping so that only standard fasteners with relative large geometrical dimensions can be colored. It is not possible to produce micro-hook and loop fastener systems in this way. With the increase of the melt flow index values with respect to consideration of enthalpy, a larger amount of heat can be permanently delivered into the plastic material dictating improved shaping behavior. It is surprising that by suitable selection of the additive, free crystal formation in the plastic material can be controlled such that mechanical characteristics such as flexibility and toughness can be dictated within a wide framework. This control is not possible with the delivery systems known to date (titanium oxide).

The process according to the present invention is especially suited to producing micro- or nano-hook and loop fasteners in which the individual interlocking elements have a height and/or width which is between 0.05 mm and 1 cm, especially in the value range from 0.6 mm to 1 mm. In this way, up to 500 interlocking means per square centimeter of the support web 10 can be produced. In one preferred embodiment of the present invention, up to 16,000 hook and loop elements and more on a square centimeter of support web 10 are possible. Calculated from the top of the support web 10 to the termination of the respective interlocking or hook and loop element over the flat head top, each pertinent element has a height of approximately 100 µm. The flat head tops have a diameter of approximately 50 µm which can be reduced in the direction toward the top end of the stalk part 17 to a size of approximately 30 µm. For this purpose, between the head part 16 and the stalk part 17, an undercut is formed at the site of the transition. The height of the head part 16 is approximately 10 µm. The size of the radial projection of the head part 16 to the top end of the stalk part 17 is also approximately 10 µm. The distances between the border of adjacently opposite head parts 16 are 30 µm to 40 µm. The diameter of the stalk parts 17 is approximately 20 µm to 35 µm. These size conditions are only examples, and can be altered in the indicated range of sizes. With the process according to the present invention it is possible for the first time to continuously provide extremely small or micro-hook and loop fasteners with a color. This production is not possible with conventional means or systems.

While one embodiment has been chosen to illustrate the invention, it will be understood by those skilled in the art that various changes and modifications can be made therein without departing from the scope of the invention as defined in the appended claims.

What is claimed is:

1. A method for producing a support web with a plurality of molded elements thereon, comprising the steps of:

providing intrinsically plastic material with an additive for one of maintaining constant melt flow index of the plastic material and increasing a melt flow index of the plastic material, the additive being a combination of a lubricant and a liquid dye together forming a coloring liquid for improving molding behavior of the plastic material in molding cavities without increasing molding temperature;

the additive being supplied by a metering device from outside of an extruder to a location in the extruder at which the plastic material is at least partially plasticized;

supplying a definable amount of the plastic material with the additive intrinsically provided therein from an extruder nozzle of an extruder to a molding tool having a plurality of mold cavities; and shaping the plastic material with the additive intrinsically provided therein in the mold cavities into the molded elements.

2. A method according to claim 1 wherein
the coloring liquid is ultramarine blue.

3. A method according to claim 1 wherein
the additive is added in an amount to the plastic material of approximately 0.05 to 5 percent by weight.

4. A method according to claim 3 wherein
the additive is added in an amount to the plastic material of 0.2 to 0.6 percent by weight.

5. A method according to claim 4 wherein
the additive is added in an amount to the plastic material of 0.5 percent by weight.

6. A method according to claim 1 wherein
the lubricant is selected from the group consisting of fatty acid esters, fatty acid ester ethoxylates, paraffin oils, vegetable oils including biodegradable rapeseed oil, and combinations thereof.

7. A method according to claim 1 wherein
the additive is provided with other components including softeners, multivalent oils, amines and alcohol ethoxylates.

8. A method according to claim 1 wherein
depending on at least one of plasticization state and temperature of the plastic material, a variable amount of the additive is supplied by the metering device such that a degree of tinting of the support web and the molded elements is uniform.

9. A method according to claim 1 wherein
at least one of the support web and the molded elements are coextruded of individual layers.

10. A method according to claim 9 wherein
an extruder with an extruder nozzle and color metering device is provided for each individual layer.

11. A method according to claim 1 wherein
the additive is supplied to a homogenization zone in the extruder by a metering device.

12. A method according to claim 1 wherein
the additive is supplied by a metering device to the extruder at a point adjacent to a point where plastic material is supplied to the extruder.

13. A method according to claim 1 wherein
the additive and the plastic material are uniformly mixed in the extruder.

14. A method according to claim 1 wherein
each molded element is a micro-fastener with a stalk extending from the support web and a head protruding from a free end of the stalk.

* * * * *